Patented June 4, 1929.

1,716,110

UNITED STATES PATENT OFFICE.

CHARLES E. BURKE, OF WILMINGTON, DELAWARE, ASSIGNOR TO E. I. DU PONT DE NEMOURS & COMPANY, OF WILMINGTON, DELAWARE, A CORPORATION OF DELAWARE.

PROCESS OF PRODUCING PENTAERYTHRITE.

No Drawing.  Application filed June 21, 1927. Serial No. 200,509.

This invention relates to an improved method for the preparation of pentaerythrite.

Pentaerythrite has long been known, and two methods for the preparation of this material are described in the literature. One of these methods (see Stettbacher, Seitschrift für des Gesamte Schiess-und Sprengstoffwesen 11, 1911, page 182, (1916)) requires approximately three weeks to complete the reaction, and is thus impracticable from a commercial standpoint. The most recent work on the second and only practical method has been carried out at Picatinny Arsenal, and is published in Organic Syntheses, vol. 4, page 53, 1925. According to this method pentaerythrite is prepared by the condensation of formaldehyde and acetaldehyde, using freshly slaked lime as a condensing agent. The reaction is carried out at 60—65° C. and is complete in about 2 hours. When the reaction is complete the reaction mixture is cooled and the calcium is precipitated as completely as possible with sulfuric acid, filtered, and the residual calcium precipitated with oxalic acid and again filtered. The filtrate is then concentrated under reduced pressure to a point where on cooling some of the pentaerythrite precipitates. This material is filtered off and the mother liquors further concentrated to a syrup from which, on cooling, a second crop of pentaerythrite crystals may be obtained.

The total yield of pentaerythrite by the above described process is given as 50 to 54 per cent of theory. When carried out on a semi-works scale in which the concentration was carried out at atmospheric pressure, yields of only 35 per cent of the theoretical were obtained.

This method as outlined presents the following disadvantages:

1. It involves a filtration of calcium oxalate which is tedious and difficult to carry out unless the whole mass is heated practically to the boiling point.

2. Since in the condensation one molecule of formic acid is formed, the precipitation of the calcium with sulfuric and oxalic acid leaves an acid solution, so that the concentration cannot be carried out in ordinary iron equipment.

3. The mother liquors form a heavy syrup on concentration, which is difficult to filter and which on a large scale operation would practically necessitate dilution with alcohol before filtration.

4. In order to get yields of 50 to 55 per cent of theory it is seemingly necessary to carry out the concentration under reduced pressure.

One object of my invention is to simplify the process of producing pentaerythrite. A further object of my invention is a process whereby higher yields of pentaerythrite may be obtained.

In carrying out the reaction according to my invention it is preferable to use formaldehyde, acetaldehyde, and water in approximately the same proportions as those used in the disclosure of the article above referred to. In my process freshly slaked lime may be used if desired, although equally good results may be obtained by using a good commercial grade of calcium hydrate.

In order to disclose my invention in more detail the following example of an actual embodiment thereof is presented. It is to be understood, of course, that this example is furnished for illustrative purposes solely, and that it is not my intention to be limited to the proportions or ingredients therein set forth.

| | | |
|---|---|---|
| Formaldehyde, 37 per cent solution | 5 mols. | 406 lbs. |
| Acetaldehyde | 1 mol. | 44 lbs. |
| Calcium hydrate | 0.6 mol. | 44.5 lbs. |
| Water | 40 mols. | 720 lbs. |

The water and formaldehyde solution are first mixed, cooled to approximately 15° C., and then acetaldehyde is added. The solution of aldehydes is then agitated and the finely powdered calcium hydroxide gradually added.

During the addition of the hydroxide the temperature gradually rises to from 35 to 45°, and when all the hydroxide has been added a filtered sample of the solution shows an alkalinity of approximately 0.4 normal. The mixture is agitated in order to keep any unused hydroxide in suspension, and the temperature held between 45 and 50° C., by the application of heat if necessary until the alkalinity of a filtered sample of the solution drops to between 0.05 and 0.1 normal.

When the alkalinity has dropped to this point a solution of a fixed alkali carbonate containing an amount of carbonate equivalent to the amount of calcium hydroxide previously used is added, and after agitating for a few minutes in order to give time for the complete precipitation of the calcium carbonate, the product is filtered and the filtrate concentrated until the pentaerythrite crystallizes out.

One improvement in my process over previous processes resides in the fact that I have discovered that if the concentration is carried out in a neutral or alkaline condition instead of in an acid condition as has previously been done, the following advantages are obtained:

1. The concentration may be carried out in ordinary iron equipment, which cannot be done with an acid solution.

2. The mother liquors, if neutral or slightly alkaline, do not form a syrup on concentration, but remain perfectly fluid and can be evaporated practically to dryness if desired.

3. It is not necessary to carry out the concentration under reduced pressure, satisfactory results being obtained at atmospheric pressure.

4. Under these conditions much improved yields are obtained. Instead of 50 to 54 per cent of theory as claimed by the previous process, I have obtained yields of from 65 to 70 per cent of theory.

According to my process, in preparing the solution for concentration the calcium may be precipitated in the usual way using sulfuric acid and oxalic acid if desired, and the solution then made alkaline before concentration. I prefer, however, to simplify the process by precipitation of the calcium with a fixed alkali carbonate, thus considerably simplifying the process and at the same time giving a non-acid solution for concentration.

For this purpose the particular carbonate used will depend somewhat upon the purity of the pentaerythrite desired. If a pure pentaerythrite, uncontaminated with other materials, is desired it is preferable to use potassium carbonate since, owing to the high solubility of potassium formate little or none of this material precipitates with the first crops of pentaerythrite. Cheaper carbonates such as sodium carbonate may be satisfactorily used for the precipitation of the calcium, but owing to the lower solubility of sodium formate some of this latter material may precipitate with the pentaerythrite.

I am aware of the fact that ammonium oxalate has been used to precipitate the calcium, and this would presumably leave a neutral solution containing ammonium formate. Owing to the fact, however, that ammonium formate hydrolyzes, and that when heated the ammonium hydroxide very readily volatilizes, this procedure very quickly gives an acid solution, and the final results obtained are in no way better than those obtained by the process outlined in Organic Syntheses, referred to above, unless during the concentration more ammonia is added from time to time to replace that which has volatilized, thus keeping the solution at all times in a neutral or slightly alkaline condition. If this is done and the solution is kept alkaline during the entire concentration period, satisfactory results may be obtained, but the amount of ammonia used is so large as to make this method of procedure practically prohibitive, unless some system of ammonia recovery is introduced, but this adds to the cost of production on a commercial scale which is necessarily an important factor.

As many apparently widely different embodiments of this invention may be made without departing from the spirit thereof, it is to be understood that I do not intend to limit myself to the specific embodiments thereof except as indicated in the appended claims.

I claim:—

1. A process of producing pentaerythrite which comprises condensing formaldehyde and acetaldehyde in acqueous solution and in the presence of calcium hydroxide, precipitating the calcium and crystallizing the pentaerythrite from an alkaline solution.

2. A process of producing pentaerythrite which comprises condensing formaldehyde and acetaldehyde in acqueous solution and in the presence of calcium hydroxide, adding a fixed alkali carbonate to precipitate the calcium, filtering off the precipitate and crystallizing the pentaerythrite from the filtrate while the latter has a non-acid reaction.

3. A process of producing pentaerythrite which comprises condensing formaldehyde and acetaldehyde in aqueous solution and in the presence of calcium hydroxide, adding a fixed alkali carbonate to precipitate the calcium, filtering off the precipitate and crystallizing the pentaerythrite from the filtrate while the latter has an alkaline reaction.

4. The process of claim 1 in which 5 moles of formaldehyde are condensed with one mole of acetaldehyde in the presence of 0.6 moles of calcium hydroxide.

5. The process of claim 2 in which 5 moles of formaldehyde are condensed with one mole of acetaldehyde in the presence of 0.6 moles of calcium hydroxide.

6. The process of claim 1 in which the condensation is carried out at a temperature of 40° C. to 55° C.

7. A process of producing pentaerythrite which comprises condensing formaldehyde and acetaldehyde in aqueous solution and in the presence of calcium hydroxide, and adding a calculated quantity of fixed alkali carbonate to precipitate the calcium from the reaction mixture.

8. A process of producing pentaerythrite which comprises condensing 5 moles of formaldehyde with one mole of acetaldehyde in aqueous solution and in the presence of 0.6 moles of calcium hydroxide, heating the mixture during condensation to a temperature between 45 and 50° C. while maintaining the alkalinity of the reaction mixture above 0.05 normal, removing the calcium from the mixture and crystallizing the pentaerythrite from an alkaline solution.

9. A process of producing pentaerythrite which comprises condensing substantially 5 moles of formaldehyde and one mole of acetaldehyde in aqueous solution and in the presence of 0.6 moles of calcium hydroxide, and precipitating the calcium from the reaction mixture by the addition of a calculated quantity of fixed alkali carbonate.

In testimony whereof I affix my signature.

CHARLES E. BURKE.